United States Patent
Gonzales et al.

(10) Patent No.: US 12,323,830 B2
(45) Date of Patent: Jun. 3, 2025

(54) SYSTEMS AND METHODS OF ENHANCED ADAPTABILITY IN REAL-TIME COMMUNICATIONS BASED ON EVENTS AND METRICS FROM NETWORK INTERFACES

(71) Applicant: Apple Inc., Cupertino, CA (US)

(72) Inventors: Erik Vladimir Ortega Gonzales, Cupertino, CA (US); Karthick Santhanam, Campbell, CA (US); Luciano M. Verger, San Jose, CA (US); Christopher M. Garrido, Santa Clara, CA (US); Ming Jin, Saratoga, CA (US); Ashwin Ramesh, San Jose, CA (US); Hsien-Po Shiang, Mountain View, CA (US); Brajesh K. Dave, Cupertino, CA (US); Yang Yu, Redwood City, CA (US); Cahya Masputra, San Jose, CA (US); Santosh Vamaraju, San Francisco, CA (US); David L. Biderman, Los Gatos, CA (US); Suryaprakash Bangalore Rajeevalochana, Bangalore (IN); Gurtej Singh G. Chandok, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 476 days.

(21) Appl. No.: 17/805,248

(22) Filed: Jun. 3, 2022

(65) Prior Publication Data

US 2022/0394515 A1 Dec. 8, 2022

Related U.S. Application Data

(60) Provisional application No. 63/197,203, filed on Jun. 4, 2021.

(51) Int. Cl.
*H04W 24/04* (2009.01)
*H04L 65/403* (2022.01)
*H04W 84/18* (2009.01)

(52) U.S. Cl.
CPC ........... *H04W 24/04* (2013.01); *H04L 65/403* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,345,671 B2 | 3/2008 | Robbin et al. | |
| 2004/0224638 A1 | 11/2004 | Fadell et al. | |
| 2020/0099605 A1* | 3/2020 | Mayrand | H04L 43/0894 |
| 2021/0185365 A1* | 6/2021 | Chan | H04N 21/47202 |
| 2022/0361264 A1* | 11/2022 | Burns | H04B 17/318 |
| 2023/0045761 A1* | 2/2023 | Pollack | H04L 1/0009 |
| 2023/0070295 A1* | 3/2023 | Xiong | H04W 28/0273 |

* cited by examiner

*Primary Examiner* — Srinivasa R Reddivalam
(74) *Attorney, Agent, or Firm* — BakerHostetler

(57) ABSTRACT

A method and apparatus of a device that manages a video telephony call is described. In an exemplary embodiment, the device receives a network event from a network service of a device. The device further determines that the network event that is due to a local disruption of a network component of the device. In addition, and in response to the determination, the device restricts a local dynamic control of the video telephony call.

30 Claims, 12 Drawing Sheets

SYSTEMS AND METHODS OF ENHANCED ADAPTABILITY IN REAL-TIME COMMUNICATIONS BASED ON EVENTS AND METRICS FROM NETWORK INTERFACES

This application claims the benefit of U.S. Provisional Patent Application No. 63/197,203 filed Jun. 4, 2021, which is incorporated herein by reference.

FIELD OF INVENTION

This invention relates generally to real-time communications and more particularly to enhancing an adaptability for the real-time communications based on events and/or metrics from network interfaces of a device.

BACKGROUND OF THE INVENTION

Video telephony is technology that is used to communicate audio-video signals between two or more devices. Video telephony can be used over different types of network technologies (e.g., Wi-Fi, Cellular, Bluetooth). However, certain Wi-Fi related events such as roaming scans during a video telephony call cause small outages on the data flow that can last typically under few hundred milliseconds and further can produce media artifacts. These media artifacts can cause dynamic local controls of the video telephony call (e.g., rate control, redundancy control, link duplication, or jitter buffer management) to affect the quality of the video telephony call.

SUMMARY OF THE DESCRIPTION

A method and apparatus of a device that manages a video telephony call is described. In an exemplary embodiment, the device receives a network event from a network service of a device. The device further determines that the network event that is due to a local disruption of a network component of the device. In addition, and in response to the determination, the device restricts a local dynamic control of the video telephony call.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
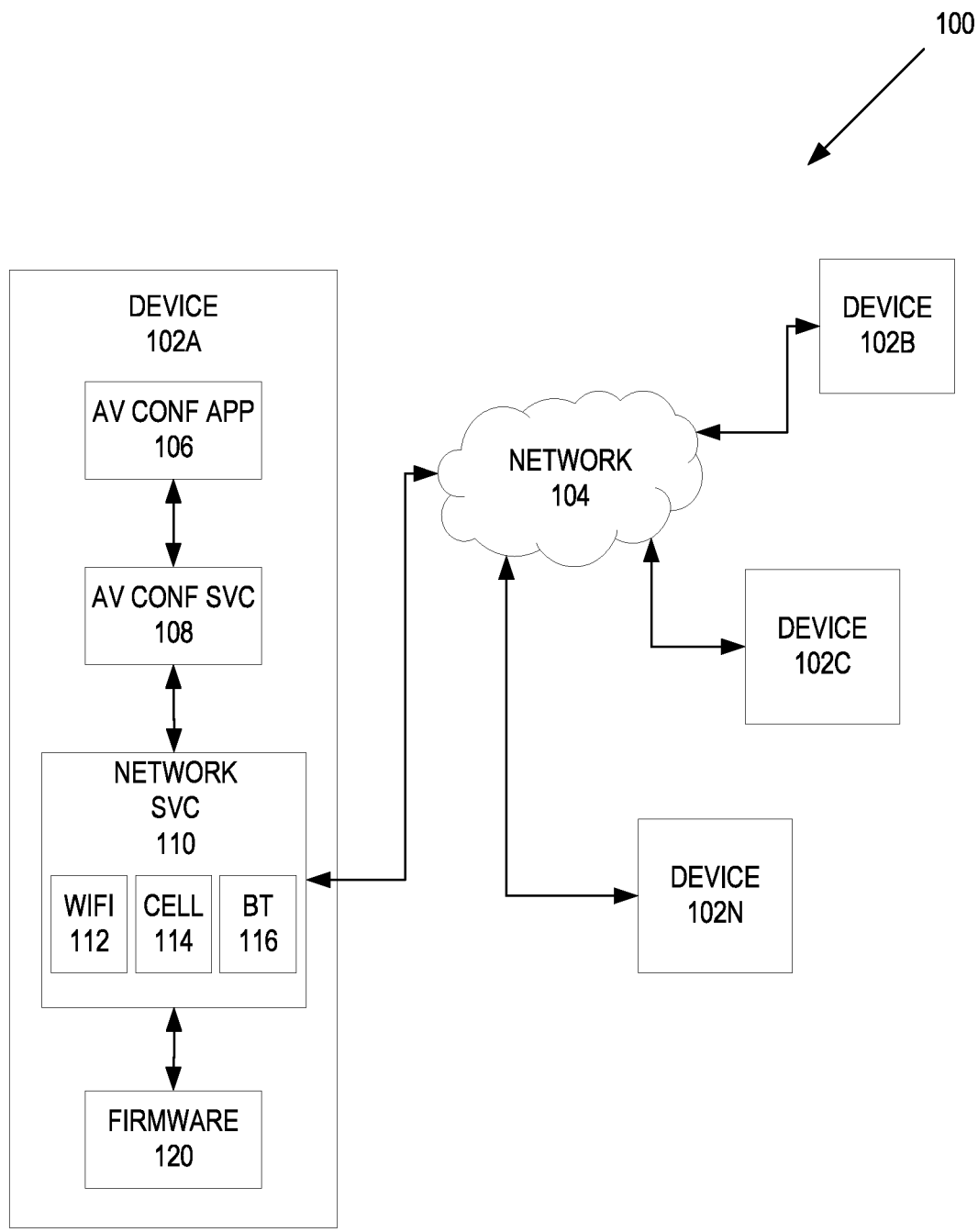
FIG. 1 is an illustration of one embodiment of a system that performs a video telephony call.

A method and apparatus of a device that manages a video telephony call is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that manages a video telephony call is described. In one embodiment, Video telephony is technology that is used to communicate audio-video signals between two or more devices. Video telephony can be used over different types of network technologies (e.g., Wi-Fi, Cellular, Bluetooth). However, certain Wi-Fi related events such as roaming scans during a video telephony call can cause small outages on the data flow that last typically under few hundred milliseconds and further can produce media artifacts. These media artifacts can cause dynamic local controls of the video telephony call (e.g., rate control, redundancy control, link duplication, or jitter buffer management) affect the quality of the video telephony call.

In addition, if the Wi-Fi is in a Coex mode with Bluetooth network interface, it has been observed that it is difficult to maintain a quality user experience while sustaining high target bitrates. Furthermore, a real-time media communications stack can benefit from having a clearer picture of the quality of local network interface (first hop) in terms of packet loss, bandwidth and delay.

In one embodiment, a network service of a device that is conducting a video telephony call can forward network events and statistics to an audio video conference service. The audio video conference service can receive these events and statistics and determine if the network component (e.g., the Wi-Fi network interface) is having a local disruption of service. For example, and in one embodiment, if the Wi-Fi network interface performs an off-channel scan, which disrupts the Wi-Fi communications temporarily, the audio video conference service can freeze or restrict different local dynamic controls used for the video telephony call (e.g., rate controller, redundancy controller, duplication manager, Coex rate control, and/or jitter buffer management). In addition, if the audio video conference service detects that the Wi-Fi off-channel stop, the audio video conference service can resume the frozen or restricted local dynamic controls.

FIG. 1 is an illustration of one embodiment of a system 100 that performs a video telephony call. In FIG. 1, device 102A is coupled through network 104 to devices 102B-D. In one embodiment, device 102A includes an audio video conference application 106 that is used to conduct a video telephony call. In this embodiment, a video telephony call is a simultaneous video and audio communication between two or more devices. At each endpoint of the video telephony call (e.g., one or more of devices 102A-D), a user can receive audio and video communications from one or more other devices and the user can further input audio and video communications into the call. Furthermore, the video telephony relies on a low latency and low jitter in the network 104 to present a quality video telephony for the call. In one embodiment, latency refers to a time lag between successive packet of the video telephony call. In this embodiment, latency can be measured a time period between successive packets received by one of the endpoints of the video telephony call. A smaller latency allows one of the devices 102A-D to process the audio and/or video packets in time to present a continuous audio-video stream to the user. A larger latency leads to the possibility that the video telephony will be delayed or interrupted. Increased latency can be due to various conditions in the network (e.g., any one of the endpoints in the video telephony call and/or any of the various components in the network 104). In addition, jitter is the variation in latency as measured in the variability over time of the end-to-end delay across a network. A network with constant delay has no packet jitter.

The devices 102A further includes an audio video service 108 that is used to manage the video telephony call. In one embodiment, the audio video service 108 manages several one or more different local dynamic controls for a video telephony call. In one embodiment, the local dynamic controls can be transmission rate control management, jitter buffer management, redundancy management, and duplication link management. In this embodiment, rate control management is managing the rate control of the audio video transmission from a device 102A-D. If device 102A-D measures a disruption in the audio video stream, the rate control management can decrease (or increase in case of network improving) the rate of transmission for the audio video feed. If the latency and/or jitter is low for the video telephony call, the rate control management can increase the rate of transmission of the audio video stream from the device 102A-D. The increase in transmission is used to send a greater quality of audio and/or video stream. Alternatively, if the latency and/or jitter increases, the rate control management will decrease the audio video stream transmission, such by transmitting lower quality of audio and/or video stream.

Another local dynamic control is jitter buffer management. In one embodiment, the device 102A-D includes a jitter buffer that is used to store the received audio video packets, so that the audio video packets can be processed at continuous rate. In this embodiment, the maximum jitter that can be countered by a jitter buffer can be equal to the buffering delay introduced before starting the play-out of the video telephony call. A larger jitter buffer can handle a greater variation in latency in the audio video stream, but can increase a delay in the presentation of the video telephony call. In contrast, a smaller jitter buffer can reduce a delay in the presentation of the video telephony call, but reduces the amount of jitter that the device can handle. Thus, the jitter buffer size can change dynamically during the video telephony call.

In addition, during the video telephony call, a section of the bandwidth used for the video telephony can be reserved for redundant packets that can be used in case a primary packet is lost. As packet loss increases, the bitrate dedicated to redundant payload in increased. Alternatively, as packet loss decreases, the redundant payload is not needed as much and the bitrate for the redundant payload is lessened. Another local dynamic control is duplication link management, which is using a secondary link for the video telephony call (e.g., Cellular network) with a primary link is down (e.g., Wi-Fi).

Furthermore, the device 102A includes a network service 110, which controls the network communications of the device 102A (e.g., communication of the data, maintaining of the network interfaces, and/or other network functions). The network service 110 additionally includes one or more interfaces (e.g., Wi-Fi interface 112, cellular interface 114, Bluetooth interface 116, and/or other types of network interfaces). The device 102A can use one or more of these interface (e.g., Wi-Fi interface 112) to conduct a video telephony call. In addition, the device 102A includes firmware 120 that is used to program the base functions of the device 102A (e.g., network interfaces (e.g., Wi-Fi 112, Cellular 114, Bluetooth 116), and other components of device 102A).

In one embodiment, each of the device 102A-D can be any type of device that can conduct a video telephony call (e. g., smartphone, laptop, personal computer, server, tablet, wearable, vehicle component, and/or any type of device that can process instructions of an application). In addition, the network 104 can be any type of network that supports a video telephony call (e.g. Wi-Fi, Cellular, Bluetooth, Ethernet, another type of network, and/or a combination therein). While in one embodiment, fours devices 102A-D and one network 104 are illustrated that are capable of conducting the video telephony call, in alternative embodiments, there can be more or less devices and more than one networks. In addition, two or more of the devices 102A-D can be involved in the video telephony call.

Figure 2:
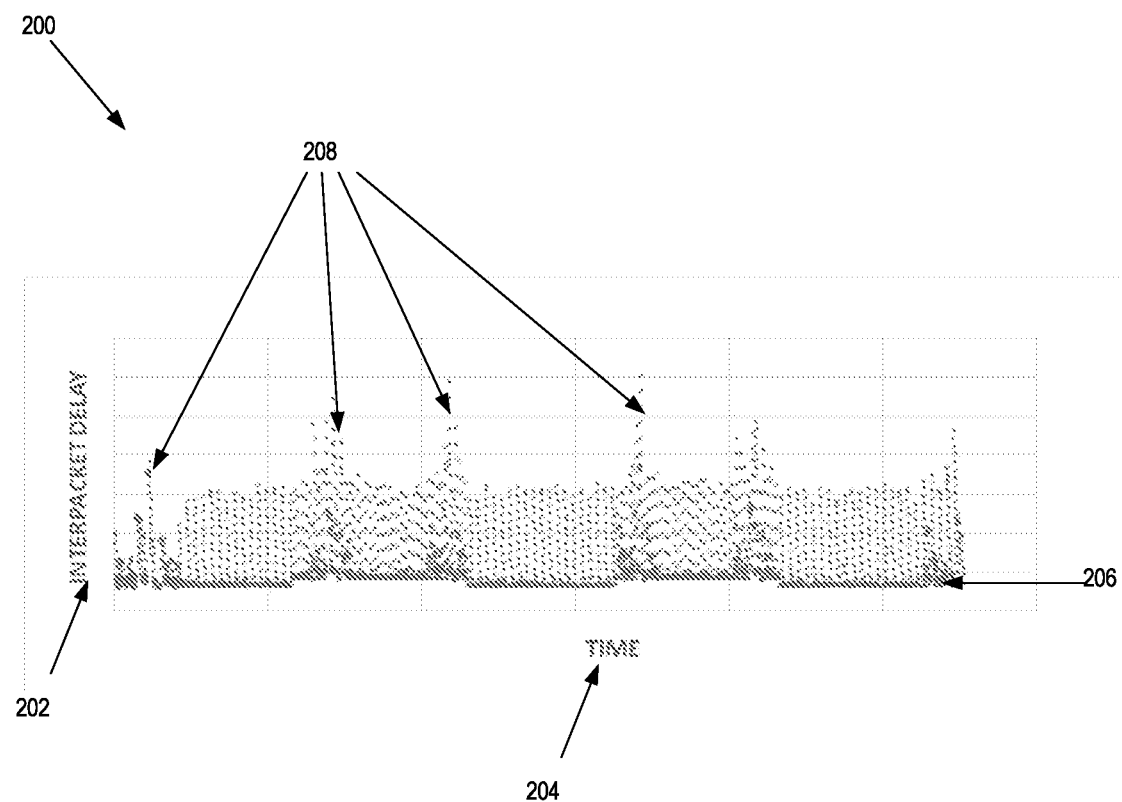
FIG. 2 is an illustration of one embodiment of a plot showing Wi-Fi events interrupting a video telephony stream.

In one embodiment, if a device (e.g., device 102A) uses a Wi-Fi interface for conducting a video telephony call, the Wi-Fi interface can sometimes go off-channel that disrupts the communications. In this embodiment, the Wi-Fi interface performs off-channel scanning that tunes the Wi-Fi radio to another channel to look for available access points (APs) or scans for APs on a channel to which it is not connected (hence "off-channel"). The device scans the off-channel APs looking for a suitable AP to connect to in case it needs to roam from its current 'on-channel' AP. FIG. 2 is an illustration of one embodiment of a plot 200 showing Wi-Fi off-channel events interrupting a video telephony stream. In FIG. 2, the plot 200 plots latency of the video telephony packets (illustrated as an interpacket delay in milliseconds (ms) (202)) versus time 204. For most of the time, the latency is below 40 ms (206), which is latency that can be used for a high quality video telephony call. However, periodically, the Wi-Fi interface will go off-channel as described above. During this time, the Wi-Fi temporarily disrupts the communication of the video telephony (and all other communications) during this time, leading large increases in latency for the video telephony call (208). This can cause the latency to jump to 100 ms, 200 ms, 300 ms, or even higher. In one embodiment, because these off-channel scans occur locally on the device, the network can capture when these off-channel scanning events begin and end.

Figure 3:
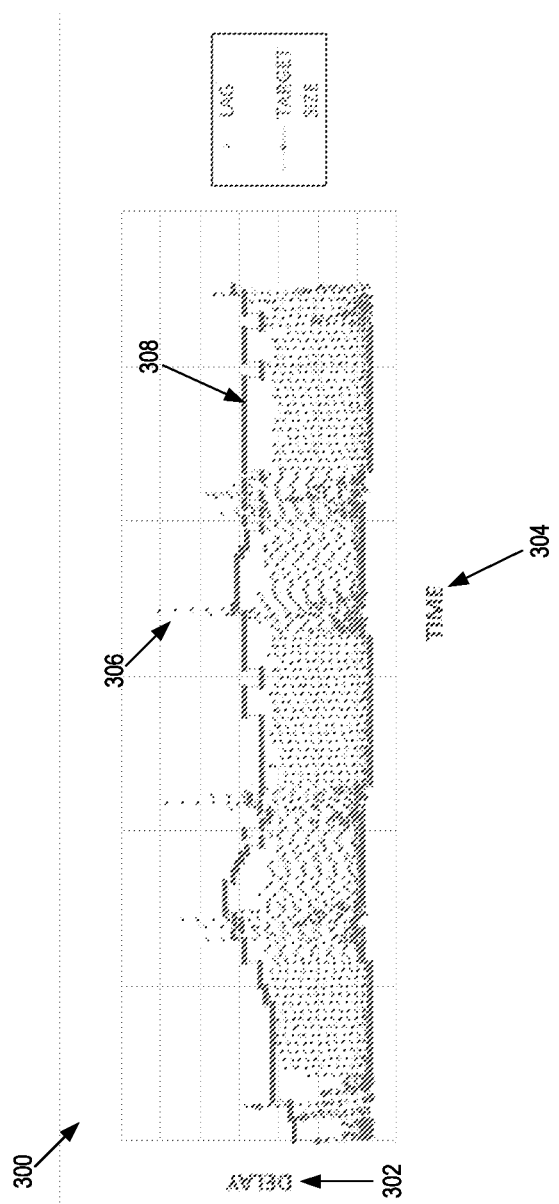
FIG. 3 is an illustration of one embodiment of a plot showing a latency and jitter buffer size over time.

FIG. 3 is an illustration of one embodiment of a plot 300 showing a latency and jitter size over time (304). In FIG. 3, plot 300 shows the jump and drop of the latency (302) jump and return to a baseline over time, which the jump in latency can be due to the Wi-Fi off-channel scan. In one embodiment, the jitter buffer size does not track this jump and drop in latency. Instead the jitter buffer size (308) stays larger than is needed for when the latency is at or around the baseline.

Figure 4:
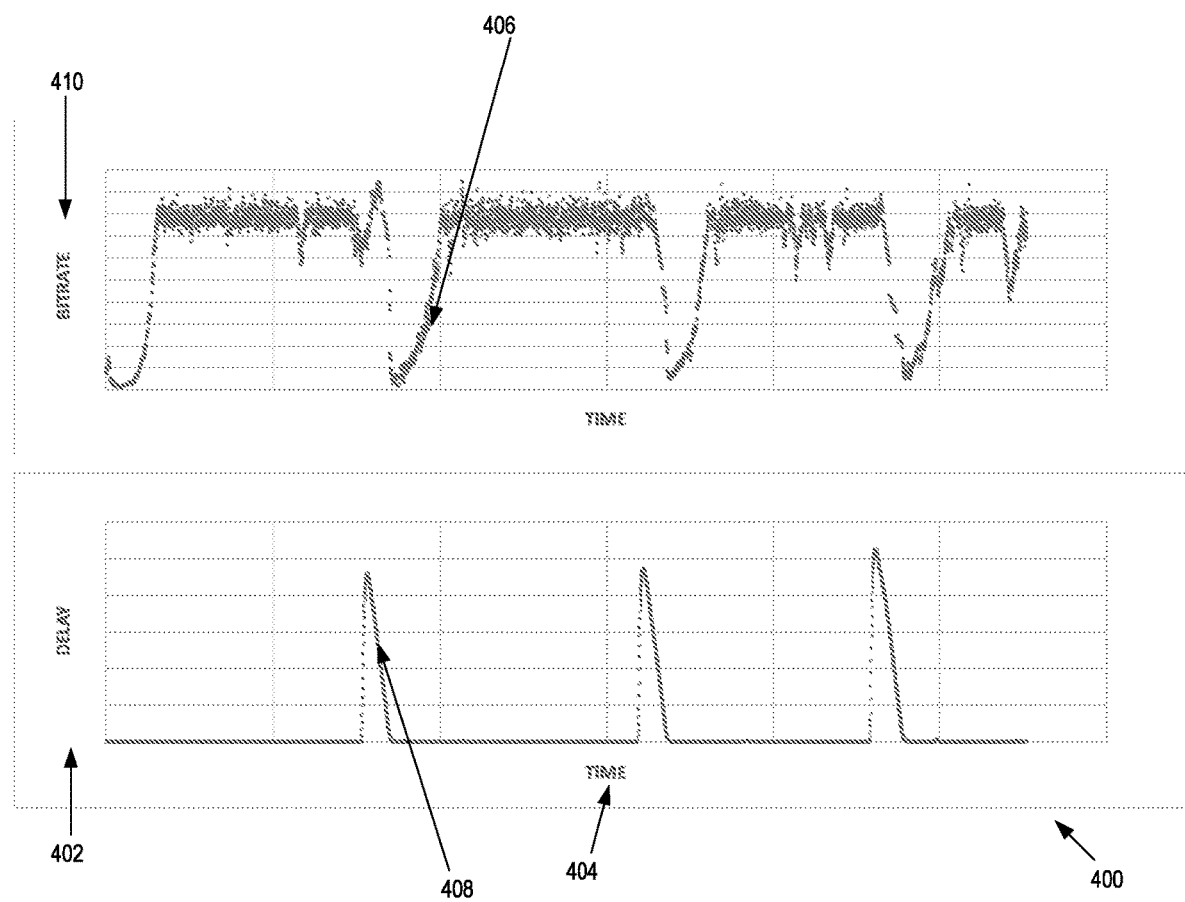
FIG. 4 is an illustration of one embodiment of a plot showing an effect of telephony rate control over time.

FIG. 4 is an illustration of one embodiment of a plot showing an effect of telephony rate control over time (404). In FIG. 4, plot 400 illustrates the effect of increased (402) due to Wi-Fi off-channel scans on the computed targeted bit rates (410). In one embodiment, when the latencies spike (408), the rate drops (406). However, when the latencies drop back down to a baseline, the targeted rate (406) lags in a recovery to a rate that is more suitable for a baseline latency. Thus, the device local dynamic controls are overreacting to the spike in latency due to the Wi-Fi off-channel scans.

In one embodiment, the network service of the device can detect when the device has entered and stopped the Wi-Fi off-channel scans. Thus, because the device can detect the start and stop of the device's Wi-Fi off-channel scans, the device can restrict the local dynamic controls on the video telephony. In this embodiment, the device's network service can report statistics of the active network interfaces and/or events related to the active network interface (e.g., start and stop of the Wi-Fi off-channel events).

Figure 5:
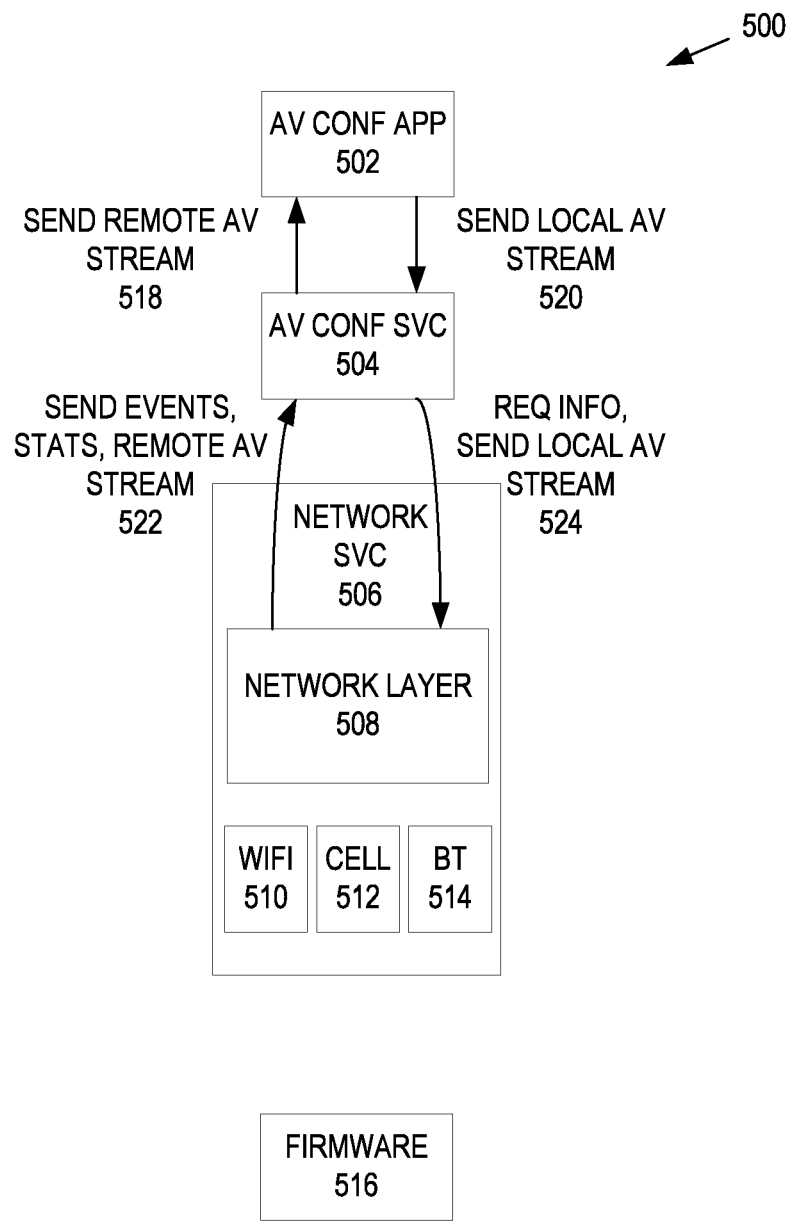
FIG. 5 is an illustration of one embodiment of a system of video telephony.

FIG. 5 is an illustration of one embodiment of a system 500 of video telephony. In one embodiment, system 500 is device 102A as described in FIG. 1 above. In FIG. 5, the system 500 includes an audio video conference application 502 the send and receives an audio video stream with the audio video conference service 504. In addition, the audio video conference service 504 requests information (524) from the network layer 508 of the network service. In addition, the audio video conference service 504 sends the local audio visual stream to the network layer (524). The network layer 508 sends events and/or statistics to the audio video conference service 504. In one embodiment, the events can be the start of and/or the end of the Wi-Fi off-channel scans. In a further embodiment, the statistics can be throughput, delay or queue size, frequency band, quality scores (e.g., delay, loss, overall channel quality, other quality statistics, and/or a combination therein). In addition, the statistics can include an indication of whether the device was in a Coex mode. In this embodiment, a Coex mode is when device Wi-Fi interface is in use as well as the Bluetooth interface. It can be difficult, in one embodiment, to maintain a quality user experience while sustaining high target bitrates under certain Wi-Fi and Bluetooth Coex scenarios. In addition, the network layer 508 sends the remote audio video stream (522) to the audio video conference service 504. The system 500 further includes the network interfaces (e.g., Wi-Fi 510, cellular 512, Bluetooth 514, and/or other types of network interfaces). These network interfaces can each utilize firmware 516.

In one embodiment, because the audio video conference service 504 receives the statistics and/or events from the network layer 508, the audio video conference service 504 would know that any spike latencies would be due to off-channel scans from the local device and not due a network disruption somewhere else in the network. In this embodiment, the audio video conference service 504 can freeze or restrict the dynamic local controls during the period of time when the Wi-Fi device is performing an off-channel scan. This allows the audio video conference service 504 to more quickly recover the quality after the off-channel scans finish.

Figure 6:
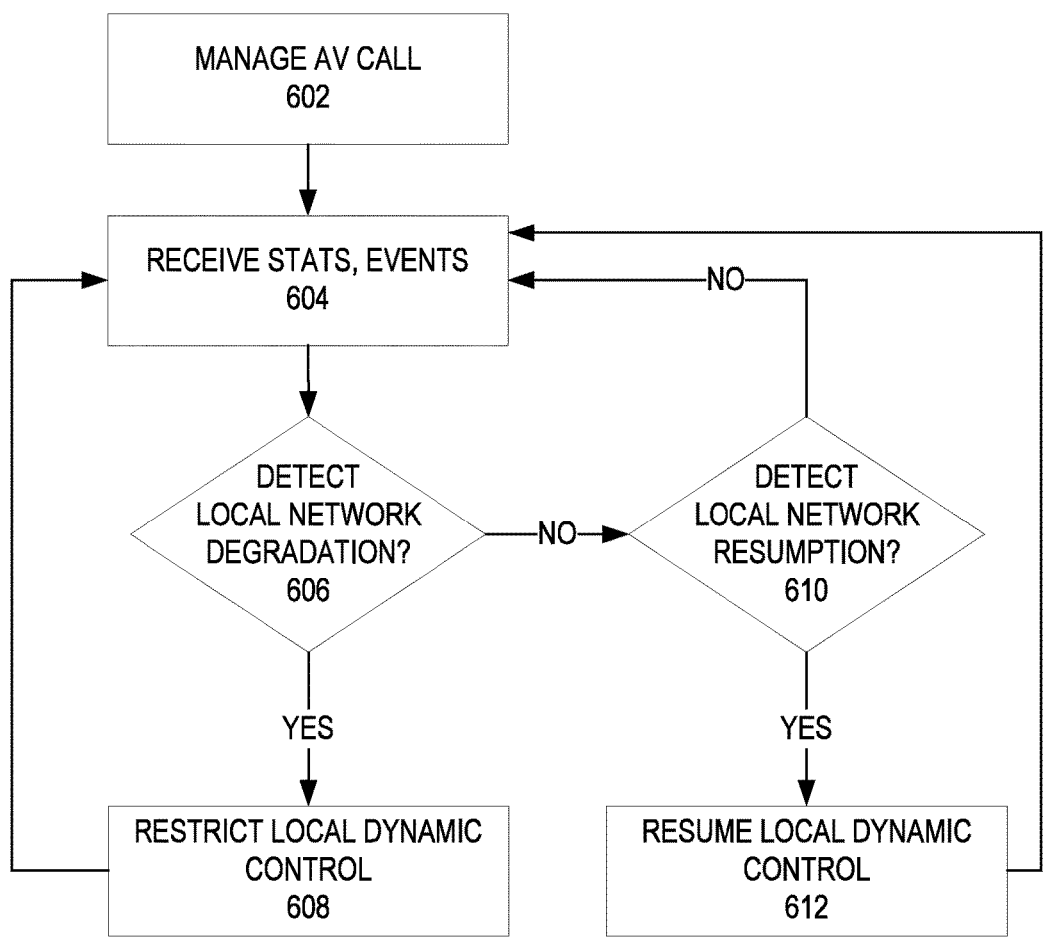
FIG. 6 is a flow diagram of one embodiment of a process that manages a video telephony call.

FIG. 6 is a flow diagram of one embodiment of a process 600 that manages a video telephony call. In one embodiment, an audio video conference service performs process 600 to manage a video telephony call, such as the audio video conference service 604 as described in FIG. 6 above. In FIG. 6, process 600 begins by managing the audio visual call at block 602. In one embodiment, process 600 employs local dynamic controls to maintain the quality and/or experience of the video telephony call. For example, and in one embodiment, process 600 can employ a rate controller to dynamically control the rate of the video telephony call, a redundancy controller to manage the amount of redundancy used by the audio video conference service 604, a duplication manager used to manage when the audio video conference service 604 should use a second (or more) network interfaces for the video telephony call, and/or a jitter controller to manage the jitter buffer.

At block 604, process 600 receives statistics and/or events from the network layer. In one embodiment, the events can be a start and/or stop of an off-channel scan for a Wi-Fi network interface. In addition, the statistics can be throughput, delay or queue size, frequency band, quality scores (e.g., delay, loss, overall channel quality, other quality statistics, and/or a combination therein), Coex mode, and/or a combination therein as described above. For example, and in one embodiment, a network interface event can include information whether there is an intermittent state (e.g., 0—no intermittent state, 1—intermittent state, undefined), an estimated intermittent period (e.g., expressed in ms, which can be 1-5 seconds, or greater or lower), and/or single outage period (e.g., expressed in ms, which can be 40-250 ms, or greater or lower).

Using the received events and/or statistics, process 600 determines if there is a local network degradation that could affect the video telephony call. In one embodiment, the start of a local Wi-Fi off-channel scan and the device is experiencing a period of intense intermittence, process 600 detects a local network degradation. Alternatively, process 600 can detect a local network degradation at the detection of a local Wi-Fi off-channel scan start. If process 600 detects a local network degradation, process 600 restricts the local dynamic controls at block 608. In one embodiment, process 600 can freeze or restrict one or more of the local dynamic controls.

Restricting the local dynamic controls is further described in FIG. 8 below. Execution proceeds to block 604 above.

If process 600 does not detect a local network degradation, process 600 determines if there is a local network resumption at block 610. In one embodiment, the end of a local Wi-Fi off-channel scan and the device is not experiencing a period of intense intermittence, process 600 detects a local network resumption. Alternatively, process 600 can detect a local network resumption at the detection of a local Wi-Fi off-channel scan end. If process 600 detects a local network resumption, process 600 resumes the local dynamic controls at block 612. In one embodiment, process 600 can resume one or more of the local dynamic controls. Resuming the local dynamic controls is further described in FIG. 9 below. Execution proceeds to block 604 above. If process 600 does not detect a local resumption of the network, execution proceeds to block 604 above.

Figure 7:
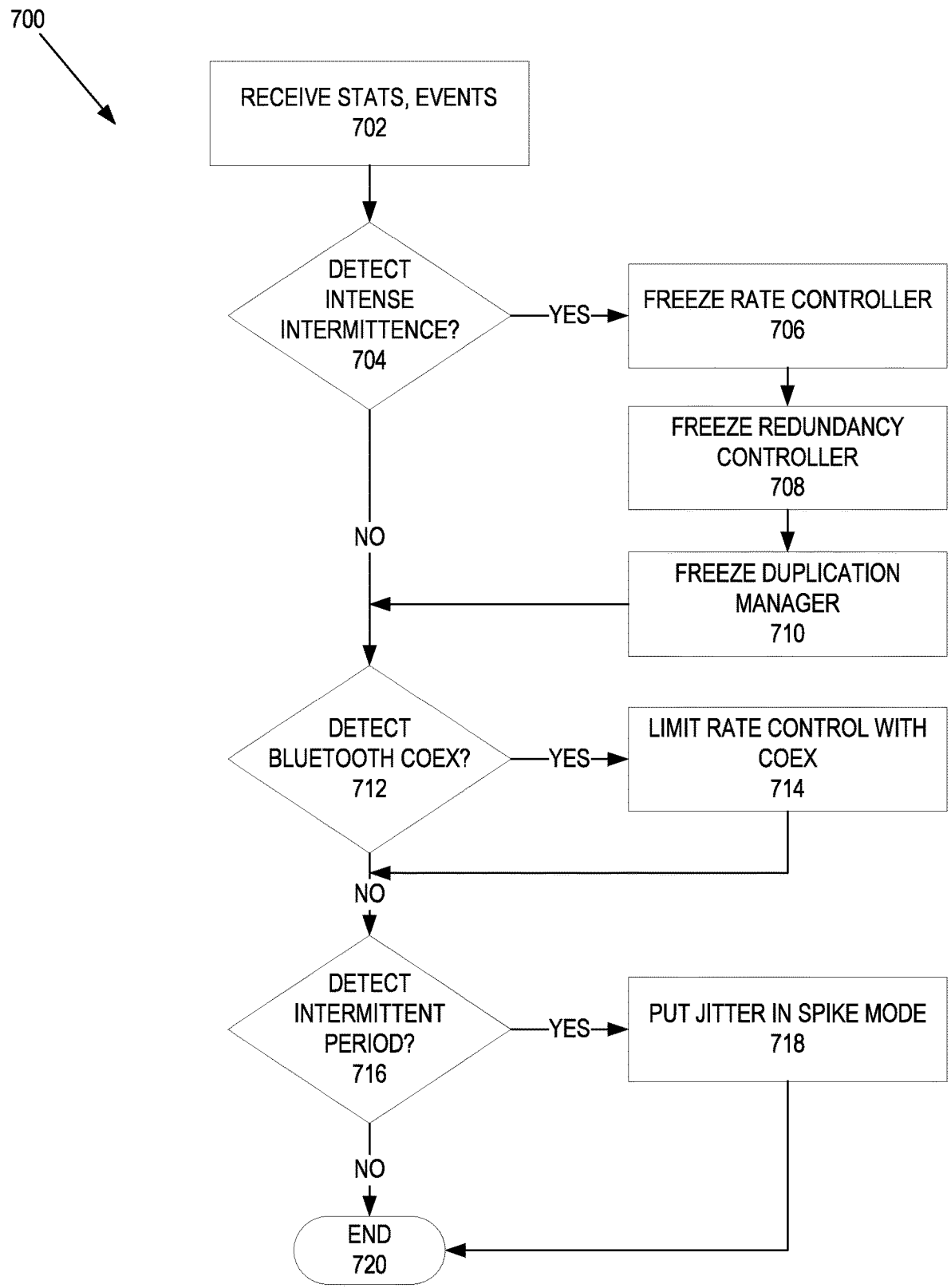
FIG. 7 is a flow diagram of one embodiment of a process that restricts a local dynamic control of a video telephony call.

FIG. 7 is a flow diagram of one embodiment of a process 700 that restricts a local dynamic control of a video telephony call. In one embodiment, process 700 is performed by a process that restricts the local dynamic controls, such as process 700 of FIG. 7, block 708 above. In FIG. 7, block 702 begins by receiving statistics and/or events. In one embodiment, process 700 receives the statistics and/or events as described in FIG. 7, block 702 above. At block 704, process 700 determines if there is intense intermittence. In one embodiment, intense intermittence is a period of time during which the network interface observed off-channel cycles, measured in a unit of time. In this embodiment, there is an intense intermittence when the intermittence is at or above a threshold (e.g., 40% or some other value). In there is intense intermittence, execution proceeds to block 706. If there is not intense intermittence, execution proceeds to block 712 below.

At block 706, process 700 freezes the rate controller. In one embodiment, the Wi-Fi off-channel outages can be confused with network congestion resulting in lower target bitrates during the call. Freezing target bitrates levels when intense Wi-Fi activity takes place and the network layer notifies audio video conference service is happening. For example, and in one embodiment, process 700 freezes such that there is no change in the rate control for the video telephony call. Alternatively, instead of freezing the rate controls, process 700 restricts the rate control such that the rate controls changes with less frequency and/or magnitude than if the intense intermittence was not detected or the Wi-Fi was not off-scanning.

Process 700 freezes the redundancy controller at block 708. In one embodiment, the off-channel outages occurring can result in the portion of the bitrate dedicated to redundant payload to considerably grow. More bits spent on redundant data means less bits spent in actual media, which can degrade the quality of the video telephony call. For example, and in one embodiment, freezing the redundancy controller can cause the quality of the video telephony call to be maintained, instead of having the redundancy controller increase the redundancy and decrease the quality of video telephony call. Alternatively, instead of freezing the redundancy controls, process 700 restricts the redundancy control such that the redundancy controls changes with less frequency and/or magnitude than if the intense intermittence was not detected or the Wi-Fi was not off-scanning.

At block 710, process 700 freezes the duplication manager. In one embodiment, the Wi-Fi related events such as roaming scans during a video telephony call that causes small outages on the data flow that last typically under few hundred milliseconds. These outages can be confused with the Wi-Fi link being defective and can trigger cellular duplication earlier than should be done. Triggering the cellular duplication unnecessarily can cause an unnecessary use of the cellular network interface due to the Wi-Fi off-channel scans. Alternatively, instead of freezing the duplication manager, process 700 restricts the duplication manager such that the duplication manager changes with less frequency and/or magnitude than if the intense intermittence was not detected or the Wi-Fi was not off-scanning. Execution proceeds to block 712.

Process 700 detects if there is a Bluetooth Coex at block 712. If there is a Bluetooth Coex, process 700 limits the rate control ramp up with Coex at block 714. In one embodiment, there can be situations when the Wi-Fi and the Bluetooth network interface are active at the same time and in a Coex mode. In this embodiment, it can be difficult to maintain high a user experience while sustaining high target bitrates under certain Wi-Fi plus Bluetooth Coex scenarios. In one embodiment, process 700 avoids ramping up to higher target bitrates when the audio video conference service has notified about Coex between Wi-Fi and Bluetooth. For example, and in one embodiment, instead of having a normal ramp up limit of one value, process 700 reduces the ramp up limit to a lower value. Execution proceeds to block 716 below.

At block 716, process 700 detects an intermittent period. In one embodiment, an intermittent period occurs when the Wi-Fi performs off-channel scanning. If there is an intermittent period detected, process puts the jitter buffer management into spike mode at block 718. In one embodiment, the small network outages due to the Wi-Fi off-channel scanning can produce spikes in the measured jitter of typically few hundred milliseconds. These jitter spikes can result in audio erasures. In spike mode, process 700 adjusts the target jitter buffer to a level based on the estimates provided by network service. In this embodiment, the target size can be adjusted faster by putting the jitter buffer management in spike mode. A target size can be quickly set, instead of waiting for the normal jitter buffer management to adjust the jitter buffer size. Execution proceeds to block 720, where process 700 ends. If there is not an intermittent period detected, execution proceeds to block 720, where process 700 ends.

Figure 8:
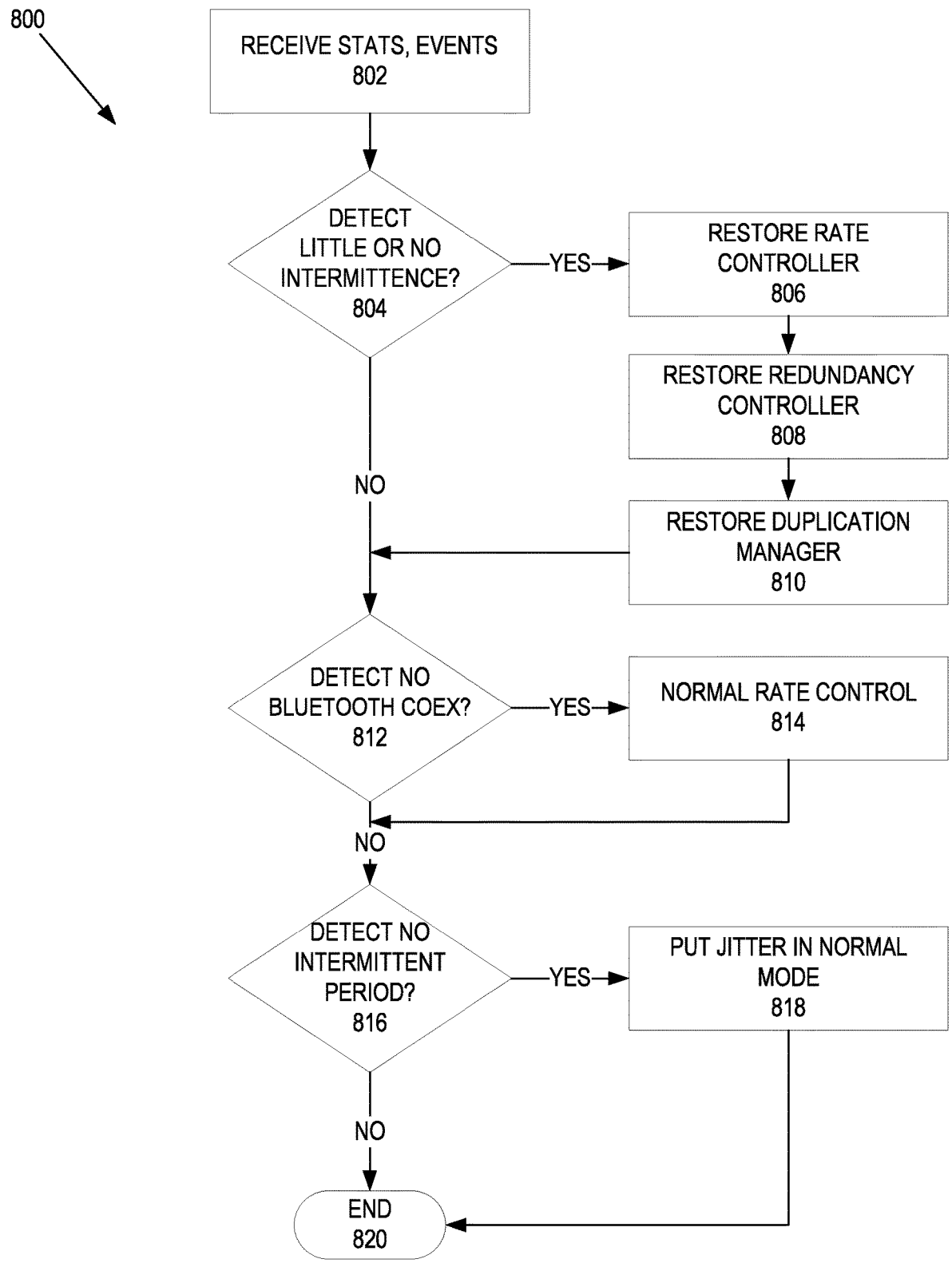
FIG. 8 is a flow diagram of one embodiment of a process that resumes a local dynamic control of a video telephony call.

FIG. 8 is a flow diagram of one embodiment of a process that resumes a local dynamic control of a video telephony call. In one embodiment, process 800 is performed by a process that resumes the local dynamic controls, such as process 700 of FIG. 7, block 712 above. In FIG. 8, block 802 begins by receiving statistics and/or events. In one embodiment, process 800 receives the statistics and/or events as described in FIG. 7, block 702 above. At block 804, process 800 determines if there is little or no intermittence. In this embodiment, there is little or no intermittence when the intermittence is at or below a threshold (e.g., 25% or some other value). In one embodiment, the threshold for little or no intermittence is the same or different threshold as the threshold for detecting intense intermittence. In there is little or no intermittence, execution proceeds to block 806. If there is not little or no intermittence, execution proceeds to block 812 below.

At block 806, process 800 restores the rate controller. In one embodiment, process 800 restores rate controller to functionality of when the Wi-Fi is not performing off-channel scans. Process 800 restores the redundancy controller at block 808. In one embodiment, process 800 restores redundancy controller to functionality of when the Wi-Fi is not performing off-channel scans. At block 810, process 800 restores the duplication manager. In one embodiment, process 800 restores duplication manager to functionality of when the Wi-Fi is not performing off-channel scans.

Process 800 detects if there is no Bluetooth Coex at block 812. If there is a no Bluetooth Coex, process 800 restores the rate control ramp up at block 814. In one embodiment, restores the rate control ramp to a normal ramp up limit to a previous value or another ramp up limit value. Execution proceeds to block 816 below.

At block 816, process 800 detects the lack of an intermittent period. If there is not an intermittent period, process 800 puts the jitter buffer in normal mode. Execution proceeds to block 820, where process 800 ends. If there is not an intermittent period detected, execution proceeds to block 820, where process 800 ends.

Figure 9:
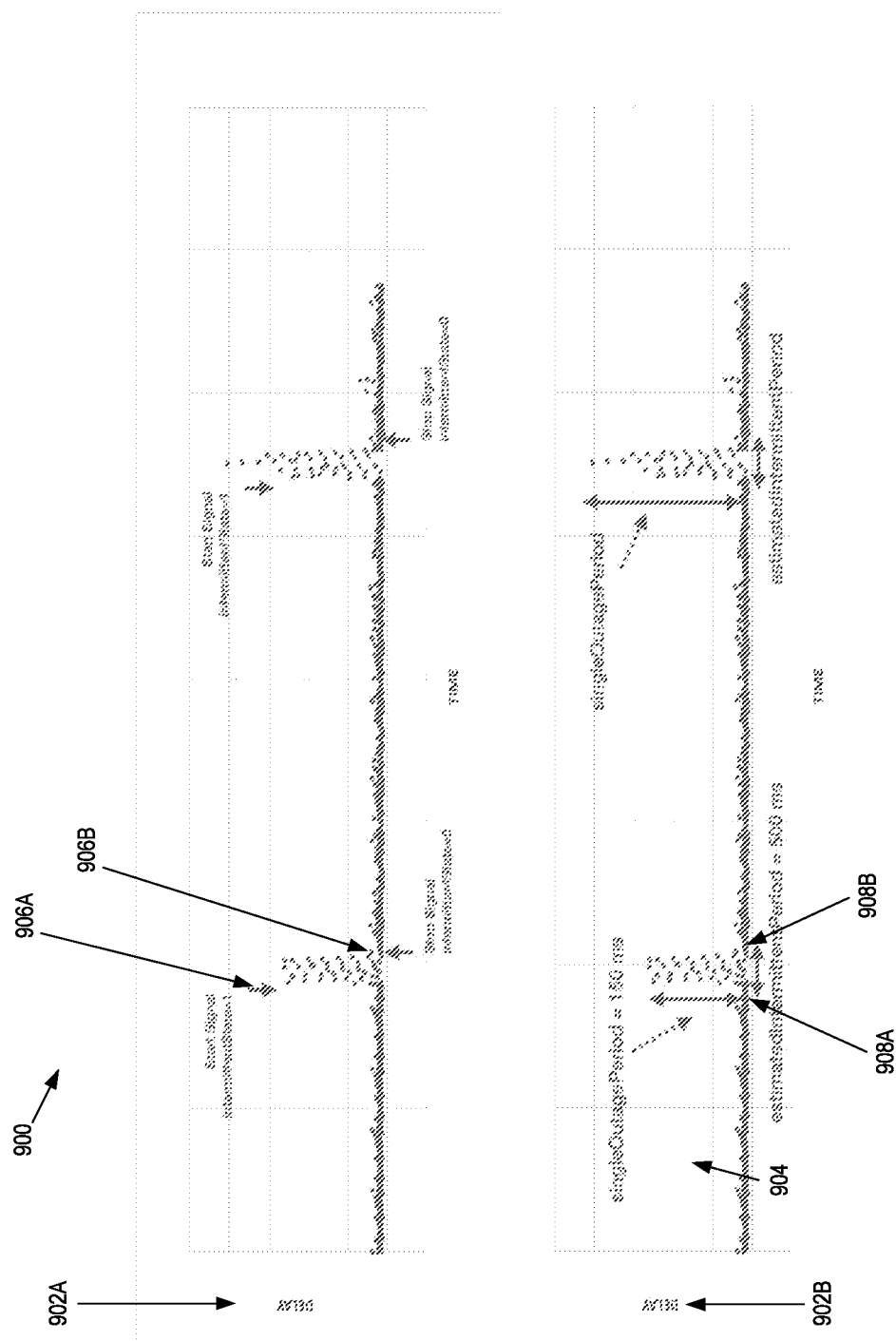
FIG. 9 is an illustration of one embodiment of a plot showing Wi-Fi off-channel periods for a video telephony call.

FIG. 9 is an illustration of one embodiment of a plot 900 showing Wi-Fi off-channel periods for a video telephony call. In FIG. 9, plot 900 illustrates a lag (902A-B) versus time (904). In this plot 900, on demand notifications of a Wi-Fi off-channel start signal 906A. In one embodiment, when an off-channel starts, a Start Signal event is generated, where the event can indicate that an intermittent state has been generated (e.g., intermittentState=1). This starts an intermittent period that can have an estimated period (e.g., 500 ms) (908B) and an outage period (e.g., 150 ms) (908A).

Figure 10:
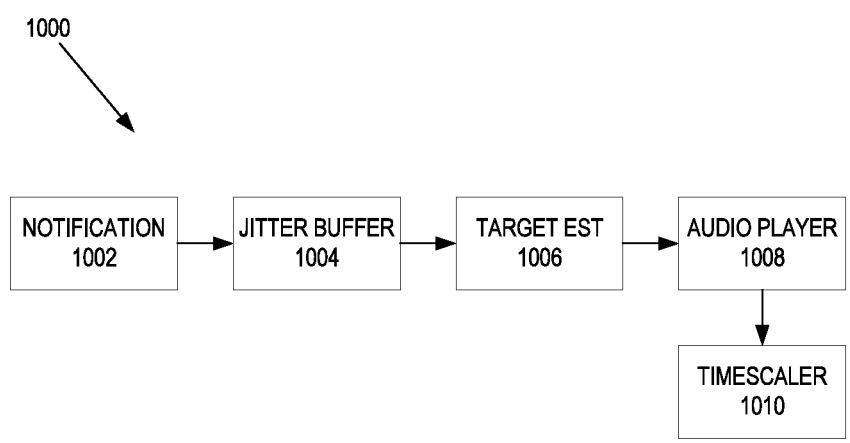
FIG. 10 is an illustration of one embodiment of notification scheme for a jitter buffer and audio player.
Figure 11:
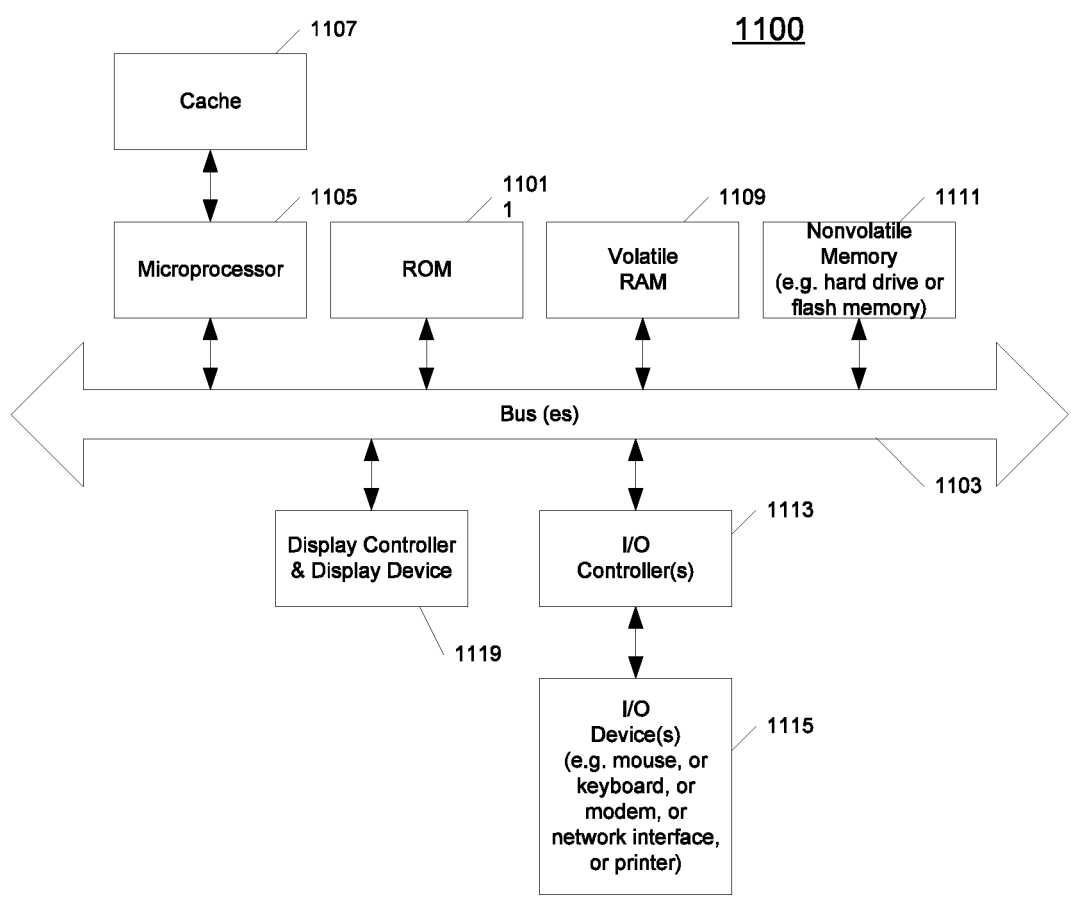
FIG. 11 illustrates one example of a typical computer system, which may be used in conjunction with the embodiments described herein.

FIG. 10 is an illustration of one embodiment of notification scheme 1000 for a jitter buffer and audio player. In FIG. 10, the notification scheme 1000 begins by an event being generated (1002). In one embodiment, the event can be an event forwarded from network service and can be in relation to a Wi-Fi off-channel scan. For example, and in one embodiment, a network interface event can include information whether there is an intermittent state (e.g., 0—no intermittent state, 1—intermittent state, undefined), an estimated intermittent period (e.g., expressed in ms, which can be 1-5 seconds, or greater or lower), and/or single outage period (e.g., expressed in ms, which can be 40-250 ms, or greater or lower). The event is forwarded to the jitter buffer 1004. The jitter buffer 1004 processes the event and forwards to the target estimator 1006. The target estimator 1006 receives the event and generates a new target for the jitter buffer. In one embodiment, for a Wi-Fi off-channel start event, the target for the jitter buffer can be raised to a size that can handle the off-channel period. Audio Player 1008 indicates to the time scaler how much to adjust. Timescaler 1010 is the component in charge of accelerating or slowing down audio in order to adjust the buffer size as per the desired target queue size FIG. 11 shows one example of a data processing system 1100, which may be used with one embodiment of the present invention. For example, the system 1100 may be implemented as a system that includes device 102A as illustrated in FIG. 1 above. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1101 and volatile RAM 1109 and a non-volatile memory 1111. The microprocessor 1105 may include one or more CPU(s), GPU(s), a specialized processor, and/or a combination thereof. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1119 and to peripheral devices such as input/output (I/O) devices which may be mice, keyboards, modems, network interfaces, printers and other devices which are well known in the art. Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 13 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
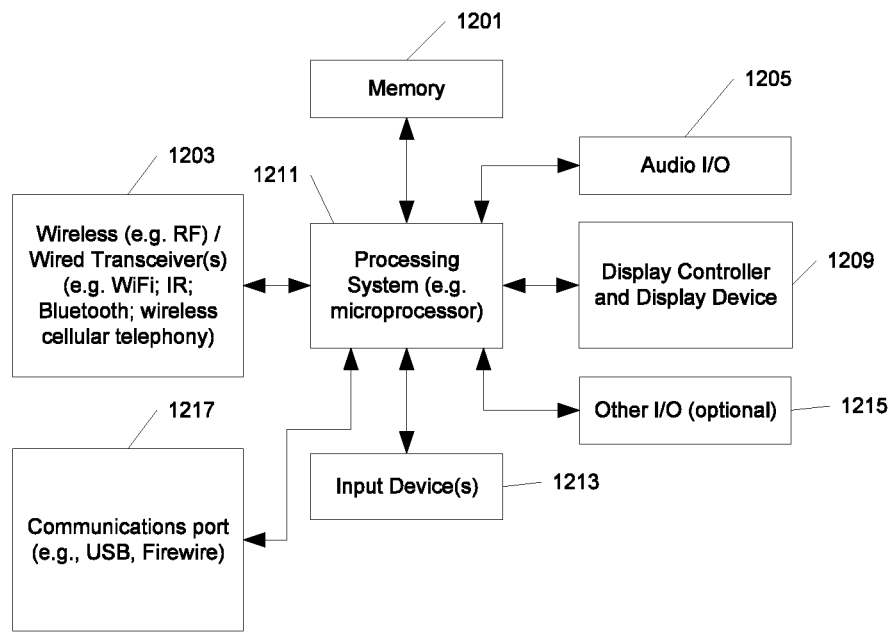
FIG. 12 shows an example of a data processing system, which may be used with one embodiment of the present invention.

FIG. 12 shows an example of another data processing system 1200 which may be used with one embodiment of the present invention. For example, system 1200 may be implemented as device 102A as shown in FIG. 1 above. The data processing system 1200 shown in FIG. 12 includes a processing system 1211, which may be one or more microprocessors, or which may be a system on a chip integrated circuit, and the system also includes memory 1201 for storing data and programs for execution by the processing system. The system 1200 also includes an audio input/output subsystem 1205, which may include a microphone and a speaker for, for example, playing back music or providing telephone functionality through the speaker and microphone.

A display controller and display device 1209 provide a visual user interface for the user; this digital interface may include a graphical user interface which is similar to that shown on a Macintosh computer when running OS X operating system software, or Apple iPhone when running the iOS operating system, etc. The system 1200 also includes one or more wireless transceivers 1203 to communicate with another data processing system, such as the system 1200 of FIG. 13. A wireless transceiver may be a WLAN transceiver, an infrared transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 10 may also be used in a data processing system. The system 1200 further includes one or more communications ports 1217 to communicate with another data processing system, such as the system 1200 of FIG. 12. The communications port may be a USB port, Firewire port, Bluetooth interface, etc.

The data processing system 1200 also includes one or more input devices 1213, which are provided to allow a user to provide input to the system. These input devices may be a keypad or a keyboard or a touch panel or a multi touch panel. The data processing system 1200 also includes an optional input/output device 1215 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1200 may be a network computer or an embedded processing device within another device, or other types of data processing systems, which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "restricting," "freezing," "communicating," "sending," "receiving," "loading," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method, comprising:
managing a video telephony call using a local dynamic control that responds to indication(s) of network performance;
receiving a network event from a network service of a device;
determining that the network event is due to a disruption of a local network component of the device; and
in response to the determination, restricting the local dynamic control of the video telephony call by reducing responsiveness of the local dynamic control.

2. The non-transitory machine-readable medium of claim 1, wherein the network component is a Wi-Fi network component.

3. The non-transitory machine-readable medium of claim 1, wherein the event is a Wi-Fi off-channel start event.

4. The non-transitory machine-readable medium of claim 1, further comprising:
receiving network statistics from the network service.

5. The non-transitory machine-readable medium of claim 4, wherein the network statistics includes at least one of throughput, delay, queue size, coex mode, frequency band, and quality score.

6. The non-transitory machine-readable medium of claim 1, wherein the local dynamic control is rate control management and the restriction is a freeze of the rate control management.

7. The non-transitory machine-readable medium of claim 1, wherein the local dynamic control is redundancy management and the restriction is a freeze of the redundancy management.

8. The non-transitory machine-readable medium of claim 1, wherein the local dynamic control is link coex management and the restriction is a limit of a rate control.

9. The non-transitory machine-readable medium of claim 1, wherein the local dynamic control is jitter buffer management and the restriction sets the jitter buffer into a spike mode.

10. The non-transitory machine-readable medium of claim 1, further comprising:
determining that network event is due to a local resumption of the network component of the device; and
in response to the resumption determination, removing the restriction of the local dynamic control of the video telephony call.

11. The non-transitory machine-readable medium of claim 1, wherein the network event is a Wi-Fi off-channel stop.

12. A method, comprising:
managing a video telephony call using a local dynamic control that responds to indication(s) of network performance;
receiving a network event from a network service of a device;
determining that the network event is due to a disruption of a local network component of the device; and
in response to the determination, restricting the local dynamic control of the video telephony call by reducing responsiveness of the local dynamic control.

13. The method of claim 12, wherein the network component is a Wi-Fi network component.

14. The method of claim 12, wherein the event is a Wi-Fi off-channel start event.

15. The method of claim 12, further comprising:
receiving network statistics from the network service.

16. The method of claim 15, wherein the network statistics includes at least one of throughput, delay, queue size, coex mode, frequency band, and quality score.

17. The method of claim 12, wherein the local dynamic control is rate control management and the restriction is a freeze of the rate control management.

18. The method of claim 12, wherein the local dynamic control is redundancy management and the restriction is a freeze of the redundancy management.

19. The method of claim 12, wherein the local dynamic control is link coex management and the restriction is a limit of a rate control.

20. The method of claim 12, wherein the local dynamic control is jitter buffer management and the restriction sets the jitter buffer into a spike mode.

21. A non-transitory machine-readable medium having executable instructions to cause one or more processing units to perform a method, comprising:
managing a video telephony call using a local dynamic control that responds to indication(s) of network performance;
receiving an indication of a network event from a network service of a device;
determining that the network event is predetermined type of network disruption; and
in response to the determination, restricting the local dynamic control of the video telephony call by reducing responsiveness of the local dynamic control.

22. The non-transitory machine-readable medium of claim 21, wherein the network service is a Wi-Fi network service.

23. The non-transitory machine-readable medium of claim 21, wherein the network event is a Wi-Fi off-channel start event.

24. The non-transitory machine-readable medium of claim 21, further comprising:
receiving network statistics from the network service.

25. The non-transitory machine-readable medium of claim 24, wherein the network statistics includes at least one of throughput, delay, queue size, coex mode, frequency band, and quality score.

26. The non-transitory machine-readable medium of claim 21, wherein the local dynamic control is rate control management and the restriction is a freeze of the rate control management.

27. The non-transitory machine-readable medium of claim 21, wherein the local dynamic control is redundancy management and the restriction is a freeze of the redundancy management.

28. The non-transitory machine-readable medium of claim 21, wherein the local dynamic control is link coex management and the restriction is a limit of a rate control.

29. The non-transitory machine-readable medium of claim 21, wherein the local dynamic control is jitter buffer management and the restriction sets the jitter buffer into a spike mode.

30. The non-transitory machine-readable medium of claim 21, further comprising:
- determining that an end of the network event has occurred due to a local resumption of the network component of the device; and
- in response to the resumption determination, removing the restriction of the local dynamic control of the video telephony call.

* * * * *